Patented Nov. 11, 1924.

1,515,439

UNITED STATES PATENT OFFICE.

HOWARD F. JENKINS, OF JEANNETTE, PENNSYLVANIA.

ADHESIVE AND COATING COMPOSITION.

No Drawing.     Application filed December 4, 1922. Serial No. 604,895.

*To all whom it may concern:*

Be it known that I, HOWARD F. JENKINS, a citizen of the United States, and resident of Jeannette, in the county of Westmoreland and State of Pennsylvania, have invented a new and useful Improvement in Adhesive and Coating Compositions; and I do hereby declare the following to be a full, clear, and exact description thereof.

My invention relates to adhesives and liquid coating compositions for use in laying linoleum, cork, rubber, tile and other floor coverings, and also for painting and other coating purposes.

The object of my invention is to provide improved adhesives and liquid coating compositions which are resistant to the action of alkalies, but which contain ingredients, such as the resins and gum-resins, that are normally attacked by alkaline solutions.

My invention is based upon the discovery that plaster of Paris, calcium sulphate, when added to an adhesive or liquid coating composition containing an adhesive agent which is attacked by alkaline solutions, renders the composition substantially alkali-proof. I consider that this protective action of plaster of Paris is due to the fact that when a composition is exposed to the air and contains plaster of Paris in intimate mixture with a substance that is attacked by alkalies, sufficient moisture is absorbed from the air to cause the plaster to set, forming films or walls of set plaster which surround the particles of the resin or other alkali-sensitive substance and mechanically protect them from the action of alkaline solutions which may later come in contact with the material. However this may be, it is a fact that when plaster of Paris is added to compositions containing elemi resins such as manila gum, copal resins, or other substances that are attacked by alkalies, the resulting composition effectively withstands exposure to the alkalies.

This property of resisting alkali renders the compositions produced according to my invention particularly useful in laying floor coverings such as linoleum, cork, rubber and the like. When such a floor covering is laid upon a concrete floor with the use of ordinary resin-containing adhesives, sufficient alkali is absorbed from the concrete in the course of time to injure the adhesive. Also, floor coverings are frequently washed with strongly alkaline washing powders or soaps, and some of the wash-water penetrates through the joints in the floor covering and attacks the adhesive.

The compositions herein described are also useful for general coating purposes, and with the addition of suitable pigments may be used for painting outdoor and indoor surfaces.

I prefer at present to employ a resin of the elemi class, particularly that known as manila gum, as a resinous base for these compositions. It will be understood, however, that any resin or gum-resin which is soluble in alcohol or any other readily volatilizable solvent may be used instead of manila gum, and that my invention may also be applied to render alkali-proof any coating composition or adhesive which would otherwise be attacked by alkalies. The copal resins, shellac, sandarac dammar and kauri may be mentioned as examples of substances which are equivalent to manila gum for the present purpose.

The proportions in which the ingredients are mixed will vary considerably, according to the desired consistency and degree of resistance to alkalies. The minimum amount of the gum or gum-resin ingredient is that amount which is sufficient to impart adhesiveness to the composition, and the maximum quantity is that amount which, with the plaster of Paris and any other solid ingredients that may be present, will give a composition which may be readily spread on the surface to be coated. When manila gum is used as the resinous ingredient, it may, for example be used in the proportions of from 2 to 8 pounds per gallon of alcohol or other solvent.

The amount of plaster of Paris employed will also vary. The protection against alkali increases with increase in the amount of plaster of Paris, but of course the amount of the plaster must not be such as to make the composition too thick to spread properly.

The solvent for the resinous ingredient is preferably denatured grain alcohol containing as little water as is commercially practicable. I have found that a small amount of water in the alcohol does no harm, but that if the alcohol is diluted with water to any considerable extent the water present will cause the plaster of Paris to set and will solidify the compositions when stored in containers.

A typical example of an adhesive prepared according to my invention for use in laying linoleum and similar floor coverings contains the following ingredients in about the proportions stated: manila gum, 5 pounds; denatured alcohol, 1 gallon; plaster of Paris, 6 pounds. It will be understood that these proportions are given for illustration only and do not limit my invention to such proportions.

The plaster of Paris, in addition to its function of rendering the material alkali-proof, also acts as a filler, and thus takes the place of the clays and other inert substances which have heretofore been used to thicken adhesives and coating compositions.

Another useful application of the compositions described herein is in the manufacture of brushes, where it replaces the adhesives ordinarily used for fastening the bristles in place.

In the claims the term "resin" is intended to include all resins, gum-resins and varnish gums which are soluble in volatile solvents such as grain-alcohol, wood-alcohol and benzol and the like, and which are not soluble in water.

In view of the variety of uses to which my invention may be applied and the various proportions in which the ingredients may be employed, it will be understood that no limitations are to be imposed upon my invention except such as are indicated in the appended claims.

I claim as my invention:

1. A composition for use as an adhesive, a coating material or the like, which contains plaster of Paris and resists attack by alkalies, but which also contains a substantial proportion of an adhesive ingredient which is normally attacked by alkalies.

2. A composition for use as an adhesive, a coating material or the like, containing manila gum, grain-alcohol and plaster of Paris.

3. A composition for use as an adhesive, a coating material or the like, containing a resin, a volatile solvent and plaster of Paris, the resin being present in quantity at least sufficient to give adhesiveness to the composition, and not sufficient to prevent spreading thereof.

4. A composition for use as an adhesive, a coating material or the like, containing manila gum, grain-alcohol and plaster of Paris, the manila gum being present in quantity at least sufficient to give adhesiveness to the composition and not sufficent to prevent spreading thereof.

5. An adhesive for floor coverings and the like, containing a resinous adhesive which is normally attacked by alkalies, and also containing a sufficient quantity of plaster of Paris to render the adhesive resistant to alkalies.

6. An adhesive for floor coverings and the like, containing a resinous adhesive which is normally attacked by alkalies, a volatile solvent, sufficient plaster of Paris to render the adhesive resistant to alkalies, and insufficient water to cause the plaster of Paris to set in a closed container.

7. An adhesive for floor coverings or the like, containing manila gum, grain-alcohol and sufficient plaster of Paris to render the adhesive resistant to alkalies.

8. A composition for use as an adhesive, a coating material or the like, containing the following ingredients in approximately the proportions stated: a resinous adhesive, 2 to 8 pounds; denatured grain alcohol, 1 gallon; plaster of Paris, sufficient to produce the consistency desired.

9. A composition for use as an adhesive, a coating material or the like, containing the following ingredients in approximately the proportions stated: manila gum, 5 pounds; denatured grain alcohol, 1 gallon; plaster of Paris, 6 pounds.

In testimony whereof I the said HOWARD F. JENKINS have hereunto set my hand.

HOWARD F. JENKINS.